United States Patent [19]

Johnson

[11] Patent Number: 5,251,965
[45] Date of Patent: Oct. 12, 1993

[54] WHEEL ASSEMBLY

[75] Inventor: Thomas J. Johnson, Evansville, Ind.

[73] Assignee: Hoosier Stamping and Manufacturing Corp., Evansville, Ind.

[21] Appl. No.: 850,388

[22] Filed: Mar. 11, 1992

[51] Int. Cl.⁵ .............................................. B60B 3/08
[52] U.S. Cl. ................................... 301/64.3; 301/63.1; 152/323
[58] Field of Search ............... 301/5.1, 63.1, 64.3, 301/64.4; 152/323, 324, 325, 327, 328, 329, 381.3, 379.3, 393, 394

[56] References Cited

U.S. PATENT DOCUMENTS

| | | | |
|---|---|---|---|
| 1,491,537 | 4/1924 | Killen | 152/393 X |
| 1,566,017 | 12/1925 | Jones | 301/64.3 |
| 1,602,630 | 10/1926 | White | 301/63 DD |
| 1,937,747 | 9/1934 | Bukolt | 301/63.1 |
| 2,271,432 | 1/1942 | Hull et al. | 301/63 DD X |
| 2,397,719 | 4/1946 | Ash | 301/63 DD |
| 2,427,430 | 9/1947 | Waldeck et al. | |
| 2,692,801 | 10/1954 | Rosenberg | 152/323 X |
| 2,848,278 | 8/1958 | Todd | 301/63.1 |
| 3,020,091 | 2/1962 | Solomon | 301/64.3 |
| 3,565,490 | 2/1971 | Statz | 301/63.1 |
| 4,580,846 | 4/1986 | Johnson et al. | 301/64.3 |

FOREIGN PATENT DOCUMENTS

| | | | |
|---|---|---|---|
| 732538 | 9/1932 | France | 301/63 DS |
| 910044 | 5/1946 | France | 152/323 |
| 318137 | 12/1956 | Switzerland | 301/63 DS |
| 281807 | 12/1927 | United Kingdom | 301/63 DD |
| 519287 | 3/1940 | United Kingdom | 301/63 DD |

*Primary Examiner*—Russell D. Stormer
*Attorney, Agent, or Firm*—Woodard, Emhardt, Naughton, Moriarty & McNett

[57] ABSTRACT

A solid elastomeric tire is provided with an inwardly extending circular flange which is received in a V-shaped groove formed by and between inner faces of the two wheel disks of a disk wheel assembly. The disks are welded together around a circle radially inward from the tire flange, and are welded to a wheel hub cylinder having bushings therein. The tire flange in the groove resists the rolling of the tire off the rim in response to axially directed force on the tire.

8 Claims, 3 Drawing Sheets

WHEEL ASSEMBLY

BACKGROUND OF THE INVENTION

1. Field of the Invention

This invention relates generally to wheel assemblies and more particularly to the combination of a solid elastomeric tire with metal rim and hub.

2. Description of the Prior Art

Although wheels with pneumatic tires are most commonly used for passenger carrying vehicles, there is still a comparatively large market for smaller wheels with solid tires. Some applications of such wheels impose harsh operating conditions on them. This can occur as a result of the nature of the equipment on which the wheel is used, the way it is operated, or the environment in which it is operated, or all of these factors combined. One example is that where the wheel assembly is used in a caster assembly. In some applications of caster assemblies, the device on which they are used is subjected to sudden changes of direction which, in some circumstances, may not result in a completely responsive swiveling for change of caster orientation. The result is a sidewards scrubbing of the tire on the ground until the caster orientation changes in accord with the direction of movement of the device. Such action is particularly harsh where the device supported by the caster is attached to some powered vehicle having the capability of raising the device from the ground as the vehicle makes a turn and then lowering the device to the ground while the vehicle is in motion. An example is the tail wheel on a brush cutter mounted to a tractor by a three-point hitch by which the cutter can be raised and lowered while the tractor is in motion. Since the caster is free to rotate on its swivel axis as the tractor moves along, it can be subjected to sharp sideward forces when the brush cutter is lowered toward the ground. When the caster tire contacts the ground as the tractor is moving, there is a strong tendency for the sharp sideward blow on the tire to force the tire sideways on or completely off the rim. It is an object of the present invention to provide a construction which resists dislodging of the tire from the rim upon sideward impact.

SUMMARY OF THE INVENTION

Described briefly, according to a typical embodiment of the present invention, a tire of elastomeric material is provided with a radially inwardly extending circular flange which is received within and between inner faces of the two wheel disks of the wheel assembly which are welded together and to the hub. This provides a comparatively inexpensive assembly which strongly resists the rolling of the tire off the rim in response to axially directed force on the tire.

DESCRIPTION OF THE PREFERRED EMBODIMENT

Figure 1:
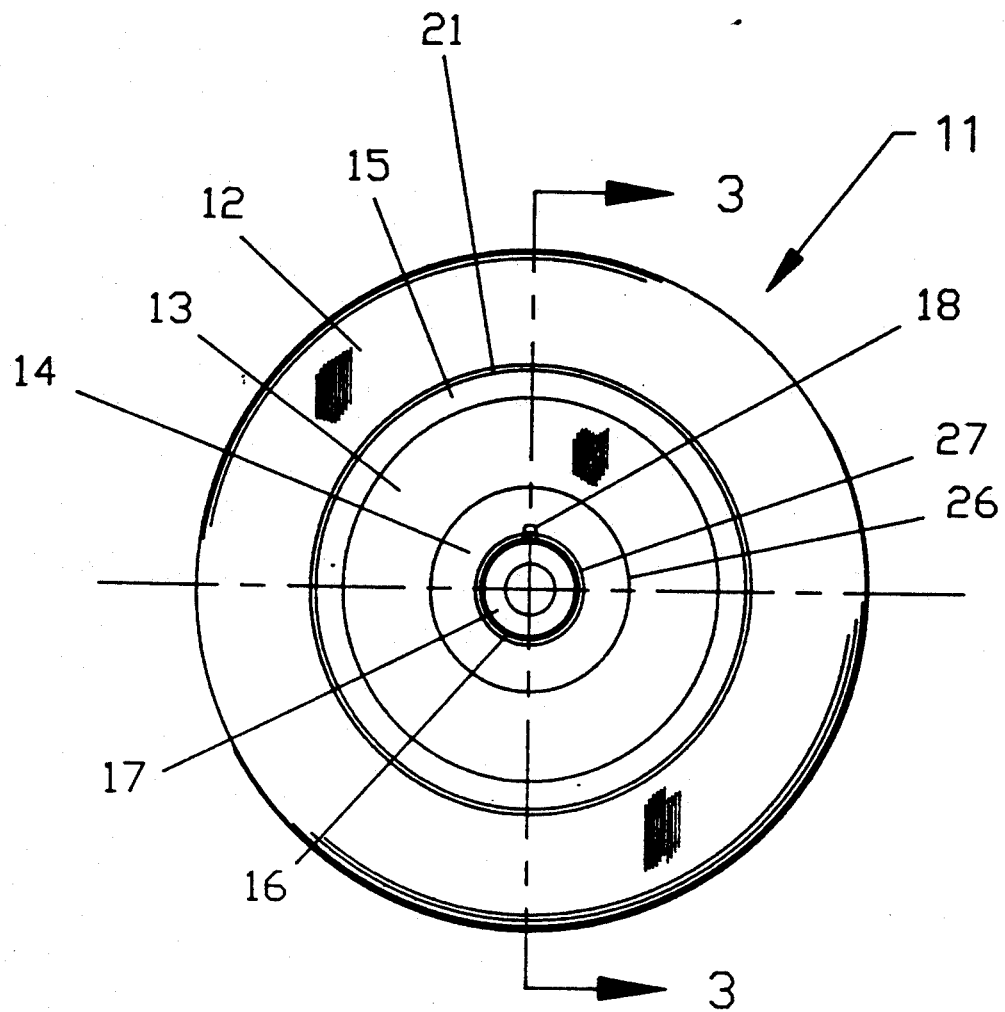
FIG. 1 is a front view of a wheel assembly according to a typical embodiment of the present invention.
Figure 2:
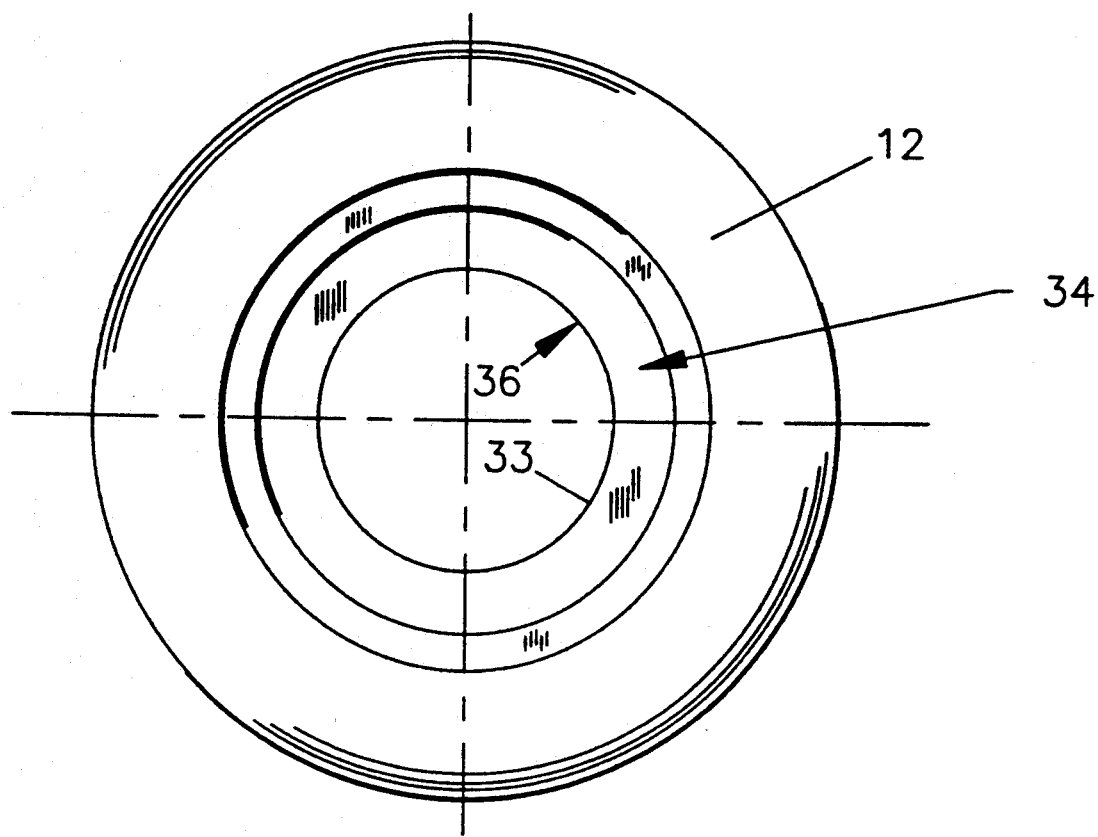
FIG. 2 is a front view of the tire dismounted from the wheel.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
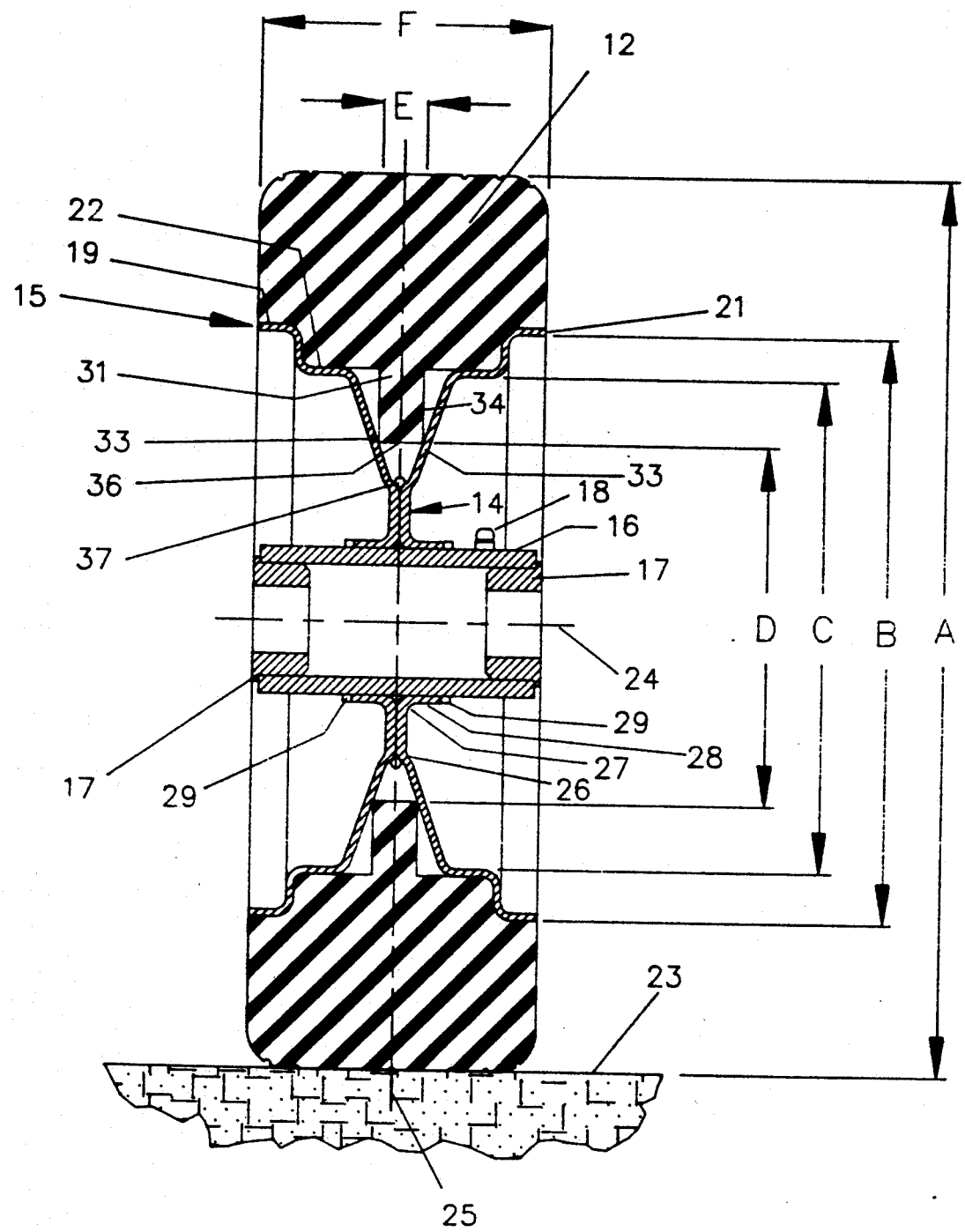
FIG. 3 is a cross section taken at line 3—3 in FIG. 1 and viewed in the direction of the arrows.

Referring now to the drawings in detail, FIG. 1 shows a wheel assembly 11 including a tire 12, a wheel disk 13 having web portion 14 and rim portion 15, a hub 16, bearings or bearing surfaces 17, and a grease fitting 18. The two disks can be identical, each being dished (FIG. 3) to provide a first shoulder 19 extending axially from the edge 21 of the rim portion of the disk, and a second shoulder 22 both radially and axially inward from shoulder 19, these shoulders cooperating to provide the rim portion supported by the tire 12 when its tread is on ground 23. Each disk extends radially inward from shoulder 22 toward the rotational centerline 24 of the assembly; and axially inward from shoulder 22 toward the center plane 25 of the assembly where it extends radially inward on the center plane 25 from circle 26 to circle 27 and then turns outwardly at circle 27 forming a short axially extending flange 28. This flange is welded at 29 to the hub tube 16 entirely around the tube.

The tire 12 has portions resting on the shoulders 19 and 22 but, instead of extending straight across to the shoulder of the other disk, it is provided with an inwardly directed circular rib 31. This rib is uniform and extends as a continuous flange for 360° around the rotational axis 24. It is rectangular in cross-sectional shape, with the intersections 33 of the face 34 and inner edge 36 of the rib being proximate or, as shown, in contact with the wheel disk portion extending inward from the shoulder 22 to the circle 26. The web portions 14 are welded together at 37 around the entire 360° circumference of the circle of contact between the web portions of the two wheel disks As an example of dimensions of one size of wheel assembly according to a typical embodiment of the present invention, and referring to FIG. 3, they are as follows, in inches:

| | |
|---|---|
| A | 10.00 |
| B | 6.62 |
| C | 5.65 |
| D | 4.00 |
| E | 0.50 |
| F | 3.25 |

While the hub and disk are typically made of cold rolled steel, the tire is typically made of elastomeric material which, according to the needs of the user, may have a durometer in a range of 65 to 90, for example.

The present invention makes possible a comparatively inexpensive but durable wheel assembly which is very resistant to dislodging of the tire from the rim as a result of sharp, axially directed impacts on the tire when the tread hits the ground or when the tread is already on the ground and a sharp side force is applied to the vehicle. In this context, it should be understood that the term "tread" is used in a broad sense and applies regardless of whether or not there are grooves in the periphery of the tire. Also, the term "vehicle" is used in a broad sense and should not be construed to imply that it is motorized or occupied.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A wheel assembly comprising:
   first and second wheel disks having a central rotational axis;
   a hub centered on said axis;
   a tire mounted on the wheel disks and sandwiched between portions of the wheel disks facing each other;
   the wheel disks being welded to the hub and to each other;
   the tire including a rib projecting radially inward between the disks and toward the hub; and
   the distance from the rotational axis of the wheel assembly to the inner marginal edge of the rib being less than the distance from the inner marginal edge of the rib to the outer circumference of the tread of the tire.

2. The wheel assembly of claim 1 and wherein:
   the tire has sidewalls, and
   the rib lies in a center plane located midway between the sidewalls.

3. The wheel assembly of claim 2 and wherein:
   the disks are shaped to each provide a rim portion with shoulders to receive the tire thereon, a web portion directly welded to the hub cylinder, and an intermediate portion between the rim portion and the web portion, the intermediate portions of the two disks cooperating to provide a V-shaped groove receiving the tire rib therein.

4. The wheel assembly of claim 3 and wherein:
   the rib has a rectangular cross section.

5. The wheel assembly of claim 4 and wherein:
   inner marginal edges of the rib contact both sides of the V-shaped groove to help retain the tire on the rim when subjected to external lateral forces tending to separate the tire from the disks.

6. The assembly of claim 2 and wherein:
   the tire is made solid of elastomeric material.

7. The assembly of claim 2 and wherein:
   the rib is circular and extends continuously throughout the internal circumferential surface of the tire.

8. A wheel assembly comprising:
   first and second wheel disks;
   a hub cylinder;
   a tire mounted on the wheel disks and sandwiched between portions of the wheel disks facing each other;
   the tire including a rib projecting radially inward between the disks and toward the hub cylinder;
   the wheel disks being fastened to the hub cylinder and to each other and having colinear axes;
   the disks being shaped to each provide a rim portion with shoulders to receive the tire thereon, a web portion directly fastened to the hub cylinder, and an intermediate portion between the rim portion and the web portion, the intermediate portions of the two disks cooperating to provide a V-shaped groove receiving the tire rib therein;
   the distance from the rotational axis of the wheel assembly to the inner marginal edge of the rib being less than the distance from the inner marginal edge of the rib to the outer circumference of the tread of the tire.

* * * * *